G. N. WILLIAMS, Jr. & J. TINLIN.

CIRCULAR SAW BLADE.

APPLICATION FILED AUG. 10, 1909.

Reissued Oct. 24, 1911.

13,300.

WITNESSES:

H. D. Breyer.

L. M. Graham.

INVENTORS

George N. Williams Jr.

+ James Tinlin

BY

Dennis Eddlebrough

ATTORNEYS

COLUMBIA PLANOGRAPH CO., WASHINGTON, D. C.

UNITED STATES PATENT OFFICE.

GEORGE N. WILLIAMS, JR., AND JAMES TINLIN, OF NEW YORK, N. Y., ASSIGNORS, BY MESNE ASSIGNMENTS, TO SAID JAMES TINLIN.

CIRCULAR SAW-BLADE.

13,300. Specification of Reissued Letters Patent. Reissued Oct. 24, 1911.

Original No. 903,933, dated November 17, 1908, Serial No. 430,109. Application for reissue filed August 10, 1909. Serial No. 512,277.

*To all whom it may concern:*

Be it known that we, GEORGE N. WILLIAMS, Jr., a citizen of the United States, residing in the borough of Manhattan, in the city, county, and State of New York, and JAMES TINLIN, a citizen of the United States, residing in the borough of Brooklyn, county of Kings, city and State of New York, have invented certain new and useful Improvements in Circular Saw-Blades; and we do hereby declare the following to be a full, clear, and exact description of the invention, such as will enable others skilled in the art to which it appertains to make and use the same.

Our invention relates to that class of circular saw-blades made of a single piece of metal, wherein, by reason of the thinness of the steel or other metal of which the saw-blade is composed compared to its area, there is a tendency of the blade to be deflected from its true plane. whether said blade is in action or repose. And our invention has for its objects, among other things, by means of perforations passing through the metal blade toward the outer or cutting edge to so materially reduce the weight of the blade by the removal of superfluous metal as to decrease the tendency to such deflection leaving the full stiffness and strength of the rim or cutting edge of the saw blade to enable it to retain its true plane whether in action or repose; and further by the manner of such lightening to so distribute the weight of the rapidly revolving metal blade as to decrease the momentum, among other things tending to relieve the shearing strain on the parts by which the saw-blade is secured to its rotating shaft, thus enabling, by reduction in the diameter of these latter named parts, the production with the same diameter of blade of a deeper cut, and also the operation of the same diameter of blade by the employment of less power. And our invention has for its object the other constructions and combinations hereinafter described and claimed.

Figure 1:
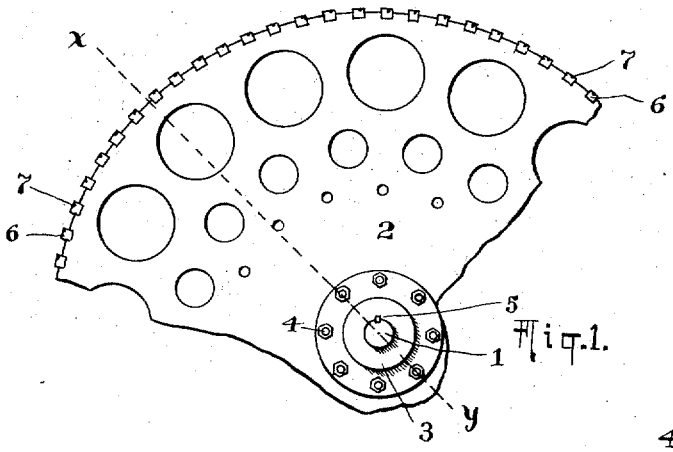
Figure 2:
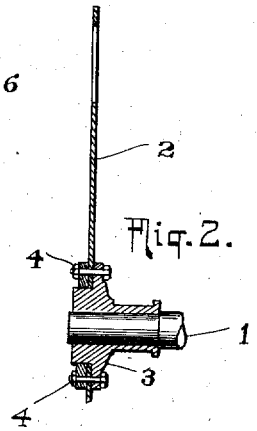
Figure 3:
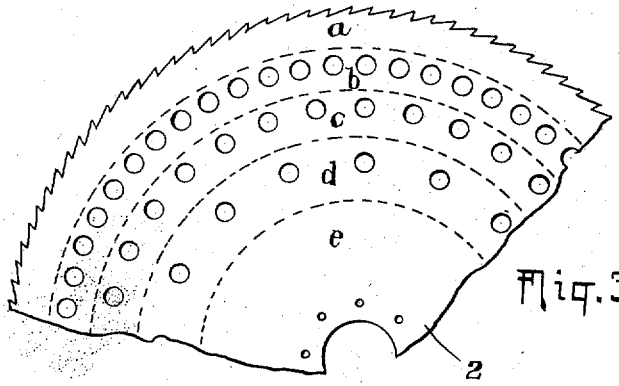
Figure 4:
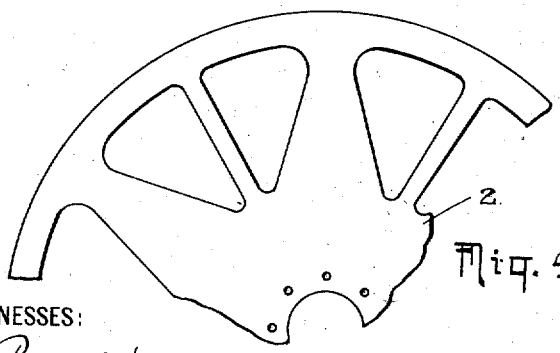

In the accompanying drawings which form part of this specification, Figure 1 shows a portion only of a circular saw-blade provided with various perforations in the blade for purpose of lightening the same, and showing also the other parts necessary to a description of our invention. It is to be understood that the saw-blade of our invention forms a complete circle, and that the perforations shown in this figure are disposed throughout the circular saw-blade in manner substantially as illustrated in Fig. 1. Fig. 2 is a cross section through the line $x$—$y$ of the parts shown in Fig. 1, showing the rotating shaft in full, and the other parts in cross section. Fig. 3 shows another form and distribution of perforations in a case where perforations of a substantially uniform size are employed. Fig. 4 shows another method of reducing the weight of a circular saw-blade where the perforations appear substantially in the form of sectors of a circle.

Referring now to these figures: 1 is a rotating shaft which is properly journaled in any machine structure, adapted to provide the necessary rapid revolutions.

2 is the saw-blade.

3 is a clamp ordinarily employed to support the circular saw-blade on its rotating shaft.

4—4 are the bolts which secure the saw-blade to the clamp.

It is to be understood that any ordinary form of clamp adapted to properly support the saw-blade may be employed, properly keyed to its rotating shaft, and that any desired number of bolts may be employed under the circumstances for securing the blade.

5 is the key which prevents clamp 3 from turning on shaft 1.

For convenience of illustration and assuming the saw-blade to be a circular sheet of metal without perforations, we have indicated in Fig. 3 by dotted arcs concentric with the center of revolution of the saw-blade in that figure, viz: the center of shaft 1, various zones which also for the purpose of illustration are to be understood each to embrace substantially the same surface area—zone $a$, including the cutting edge of the saw-blade and its teeth in cases where teeth are employed; zone $b$, wider than zone $a$, but containing substantially the same surface area; zone $c$ again wider than zone $b$, but containing substantially the same surface area as either zone $a$ or zone $b$; zone $d$ again wider than zone $c$, but containing substantially the same surface area as either zone *a*, *b*, or *c*. The circular space within the inner arc of zone *d* we have for purpose of illustration marked *e*. Referring now to these zones, it is to be understood that zone *a* is of sufficient width for proper support of the cutting edge of the saw-blade in its work of cutting whether the saw-blade is fed to its work by a gravity feed, or by a positive feed, or otherwise, or whether the material be fed to the cutting saw-blade. Zone *b*, we reduce in surface area by perforations passing through the blade, leaving, however, sufficient metal between zone *a* and zone *c* to safely support zone *a* in view of the weight of zone *a* and the work it is to perform in cutting and also in view of the material employed in making the blade, and we prefer that within zone *b* such reduction of surface area within the limitations of zone *b* shall be greater toward the outer edge of zone *b*, and so decrease toward the inner edge of zone *b* in view of the circumstances above referred to. Zone *c*, we also reduce by perforations in substantially the same manner as zone *b*, as above stated, leaving, however, a greater surface area of metal therein than remains in zone *b* in view of the fact that it is nearer its point of support, viz: the central disk *e*, the clamp 3, and the shaft 1. We also reduce zone *d* by perforations, as above stated, leaving, however, a greater area of metal therein than remains in zone *c* in view of the fact that it is again nearer its point of support, as above described. Obviously substantially the same proportionate increasing area of metal is to be provided in succeeding zones within zone *d*, where it is deemed desirable to reduce the surface area of the saw-blade further, without departing from the spirit of our invention, the intention being that the reduction of surface area in each annular zone of equal area while greatest within the contingent of safety toward the cutting edge is to be decreased in view of the decreasing distance from the point of support, and we prefer that all reduction of surface area by perforations shall be substantially uniformly disposed throughout the entire arc of each zone respectively.

Obviously the reduction of the surface area described in the foregoing paragraph, viz: by perforations whose combined area in each zone of equal area increases toward the zone *a* of the teeth, results in substantially corresponding radial reduction of weight in the direction of the increase of velocity due to the distance from the center of rotation and also, at the same time, the remaining metal is so proportioned that its strength increases toward the center substantially in proportion to the load which it is called upon to support.

In Fig. 1 we show the saw-blade lightened by a plural series of perforations largest near the cutting edge and decreasing as they approach the center.

In Fig. 3 we show the saw-blade lightened by a plural series of perforations of a uniform size, located at different distances from the center. In this instance, however, the intervening space between the perforations nearest the cutting edge of the saw-blade is to be less than the intervening space between the perforations next farther removed from the cutting edge of the saw-blade, and so on toward the center so that an increasing surface area of metal for the purpose of support is provided the nearer we approach the point of support above described.

In Fig. 4 we show the saw-blade having twelve sector-like perforations substantially uniformly disposed in relation to disk *e*, whereby an increasing area of metal is also provided as above stated. Obviously also perforations of other shapes, such as diamond-shaped or square, may be employed properly distributed throughout the saw-blade without departing from the spirit of our invention, and we do not limit ourselves to a saw-blade in which the perforations are of any particular shape. In other words by way of further illustration, in view of the material employed, the diameter of the blade in proportion to its thickness, and treating each radius of the circle as a supporting beam for support of the weight of the cutting edge, sustained at its inner end by the disk *e* and its supporting parts, we have removed from each beam superfluous weight in such amount that the cross-section of each beam decreases as we approach the cutting edge substantially in proportion to the load it is called upon to support, thereby relieving it from this weight and strengthening it at its outer end where it is to sustain the weight of the cutting edge as well as the strain of the work required to be performed.

It is to be understood that the saw-blade of our invention is adapted to various kinds of work. In the cutting of wood or metal it is to be supplied with the proper kind of cutting teeth. In its application to stone we may employ rectangular teeth 6 (Fig. 1) which are inserted in the edge of the blade in the ordinary manner. The diamonds are indicated at 7. They are inserted in the teeth for the purpose of rapid cutting and in the ordinary manner. Any other kind of teeth than diamond teeth, however, may be employed adapted to cut under the action of the rapid rotary motion, or we may employ sand or other ingredients supplied to the blade for cutting the stone under appropriate conditions, thus dispensing with the use of inserted or other cutting teeth. When employed for cutting stone, water is to be supplied to the blade among other things to facilitate the cutting action and to reduce the temperature of the parts in the ordinary manner, and we do not limit ourselves to a saw-blade adapted to wood, stone, metal or any other material, nor do we limit ourselves to a saw-blade having inserted teeth. Also we prefer in the saw-blade of our invention to employ a single piece of steel or other metal of substantially uniform thickness throughout. Obviously, however, a saw-blade thicker within some part of disk *e* or provided with ribs extending from its central portion outward toward its rim and perforated as described may be employed without departing from the spirit of our invention, and we do not limit ourselves to a saw-blade of substantially uniform thickness throughout.

What we claim is:—

1. A circular saw blade made of a single sheet of metal having a central hub section, an outer continuous rim section, and an intermediate rim-supporting section from which superfluous metal has been removed by perforations so disposed that the area of unperforated metal in the rim-supporting section increases from the rim section toward the hub section; substantially as described.

2. A circular saw blade made of a single sheet of metal having a central hub section, an outer continuous rim section, and an intermediate rim-supporting section from which superfluous metal has been removed by perforations so disposed that the area of unperforated metal in the rim-supporting section increases from the rim section toward the hub section substantially in proportion to the load it is called upon to support; substantially as described.

3. A circular saw blade made of a single sheet of metal of substantially uniform thickness having a central hub section, an outer rim section, and an intermediate rim-supporting section from which superfluous metal has been removed by perforations symmetrically disposed throughout its area and of such extent that the remaining unperforated metal in the rim-supporting section increases from the rim section toward the hub section substantially in proportion to the load it is called upon to carry; substantially as described.

In testimony whereof, we affix our signatures, in presence of two witnesses.

GEORGE N. WILLIAMS, Jr.
JAMES TINLIN.

Witnesses:
F. E. Alexander,
Erwin Keeler.

Copies of this patent may be obtained for five cents each, by addressing the "Commissioner of Patents, Washington, D. C."